(12) United States Patent
Nishimura

(10) Patent No.: US 11,008,450 B2
(45) Date of Patent: May 18, 2021

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Shota Nishimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 78 days.

(21) Appl. No.: 16/334,876

(22) PCT Filed: Sep. 19, 2017

(86) PCT No.: PCT/JP2017/033679
§ 371 (c)(1),
(2) Date: Mar. 20, 2019

(87) PCT Pub. No.: WO2018/061859
PCT Pub. Date: Apr. 5, 2018

(65) Prior Publication Data
US 2020/0017673 A1    Jan. 16, 2020

(30) Foreign Application Priority Data

Sep. 28, 2016   (JP) .............................. JP2016-190340
Sep. 28, 2016   (JP) .............................. JP2016-190342

(51) Int. Cl.
| | | |
|---|---|---|
| *C08L 27/06* | (2006.01) | |
| *B29C 41/18* | (2006.01) | |
| *B29C 41/22* | (2006.01) | |
| *B32B 5/18* | (2006.01) | |
| *B32B 27/06* | (2006.01) | |
| *B32B 27/22* | (2006.01) | |
| *B32B 27/30* | (2006.01) | |
| *B29K 27/06* | (2006.01) | |
| *B29K 75/00* | (2006.01) | |
| *B29K 105/00* | (2006.01) | |
| *B29K 105/04* | (2006.01) | |

(52) U.S. Cl.
CPC .............. *C08L 27/06* (2013.01); *B29C 41/18* (2013.01); *B29C 41/22* (2013.01); *B32B 5/18* (2013.01); *B32B 27/065* (2013.01); *B32B 27/22* (2013.01); *B32B 27/304* (2013.01); *B29K 2027/06* (2013.01); *B29K 2075/00* (2013.01); *B29K 2105/0064* (2013.01); *B29K 2105/04* (2013.01); *B32B 2250/02* (2013.01); *B32B 2250/24* (2013.01); *B32B 2266/0278* (2013.01); *B32B 2307/306* (2013.01); *B32B 2307/744* (2013.01); *B32B 2605/003* (2013.01)

(58) Field of Classification Search
CPC ....... B32B 5/18; B32B 27/065; B32B 27/304; B32B 2264/0242; B32B 2305/022; B60R 13/0256
See application file for complete search history.

(56) References Cited

U.S. PATENT DOCUMENTS

| | | | |
|---|---|---|---|
| 3,795,634 A * | 3/1974 | Neilsen ................... | C08J 9/0061 521/73 |
| 4,675,356 A | 6/1987 | Miyata | |
| 2010/0003211 A1* | 1/2010 | Sakamoto ............ | C09D 183/04 424/78.09 |
| 2012/0034467 A1* | 2/2012 | Nagasaka ............... | C08L 25/16 428/412 |
| 2013/0089728 A1* | 4/2013 | Kobayashi ............ | B32B 27/065 428/319.3 |
| 2017/0342239 A1* | 11/2017 | Ni ........................ | C08K 5/3462 |

FOREIGN PATENT DOCUMENTS

| | | |
|---|---|---|
| JP | S61174270 A | 8/1986 |
| JP | H01304140 A | 12/1989 |
| JP | H0439344 A | 2/1992 |
| JP | H0867774 A | 3/1996 |
| JP | 2003048281 A * | 2/2003 |
| JP | 2003048281 A | 2/2003 |
| JP | 2011031410 A | 2/2011 |
| JP | 2011173974 A | 9/2011 |
| JP | 2012007026 A | 1/2012 |
| JP | 2014005449 A | 1/2014 |

OTHER PUBLICATIONS

Translation of JP 2003-048281, Nishikata et al., Feb. 18, 2003. (Year: 2003).*
Database CA [Online] Chemical Abstracts Service, Columbus, Ohio, US; Yoshida, Hiroshi: "Thermoplastic resin particle compositions for slush molding", XP002797319, retrieved from STN Database accession No. 2014:70147, 2014.
Feb. 17, 2020, the Extended European Search Report issued by the European Patent Office in the corresponding European Patent Application No. 17855814.4.
Nov. 28, 2017, International Search Report issued in the International Patent Application No. PCT/JP2017/033679.
The Kinki Chemical Society, "Polyvinyl Chloride" edited by the Division of Polymer Sciences, 1988, pp. 75-104, published by Nikkan Kogyo Shimbun Ltd., Japan.
Apr. 2, 2019, International Preliminary Report on Patentability issued in the International Patent Application No. PCT/JP2017/033679.
Oct. 5, 2020, Communication pursuant to Article 94(3) EPC issued by the European Patent Office in the corresponding European Patent Application No. 17855814.4.

* cited by examiner

*Primary Examiner* — Hai Vo
(74) *Attorney, Agent, or Firm* — Kenja IP Law PC

(57) ABSTRACT

Provided is a vinyl chloride resin composition that enables production of a vinyl chloride resin molded product that has excellent surface lubricity and can inhibit formation of voids in a foamed polyurethane molded product laminated therewith. The vinyl chloride resin composition contains a vinyl chloride resin, a plasticizer, and ether-modified silicone oil.

12 Claims, No Drawings

US 11,008,450 B2

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed by a vinyl chloride resin molded product and a laminate obtained by lining a surface skin formed by a vinyl chloride resin molded product with a foamed product such as foamed polyurethane have conventionally been used in the formation of automobile interior components such as automobile instrument panels. A vinyl chloride resin molded product forming a surface skin of an automobile interior component such as an automobile instrument panel is required to display performance in terms of various aspects. For example, the surface of the molded product is required to have good lubricity and suppressed stickiness.

Attempts have been made in recent years to improve vinyl chloride resin compositions and vinyl chloride resin molded products that can suitably be used in production of automobile instrument panels and other automobile interior components.

In one specific example, PTL 1 and 2 report that by forming a vinyl chloride resin molded product using a vinyl chloride resin composition for powder molding that contains a plasticizer and silicone oil, it is possible to reduce plasticizer bleeding (ease with which plasticizer seeps to the surface) and fluff stickiness (ease with which fibrous waste adheres when the surface is wiped by cloth) of the molded product. Note that methacryloxy-modified silicone oil is used as the silicone oil in PTL 1, whereas hydroxy group-modified silicone oil (silanol-modified silicone oil) is used as the silicone oil in PTL 2.

CITATION LIST

Patent Literature

PTL 1: JP 2011-173974 A
PTL 2: JP 2012-7026 A

SUMMARY

Technical Problem

Extensive investigation by the inventor has revealed that when a laminate is produced by using a foamed polyurethane molded product to line a vinyl chloride resin molded product formed using a conventional vinyl chloride resin composition such as described in PTL 1 and 2, although surface lubricity of the vinyl chloride resin molded product is good, comparatively large spaces (voids) are formed in the foamed polyurethane molded product. The inventor consequently realized that further improvement is required in order to inhibit formation of such voids.

Accordingly, one objective of the present disclosure is to provide a vinyl chloride resin molded product that has excellent surface lubricity and can inhibit formation of voids in a foamed polyurethane molded product laminated therewith, and also to provide a vinyl chloride resin composition that enables production of this vinyl chloride resin molded product.

Another objective of the present disclosure is to provide a laminate that includes a foamed polyurethane molded product and a vinyl chloride resin molded product, has excellent surface lubricity, and in which formation of voids has been suppressed.

Solution to Problem

The inventor conducted diligent investigation with the aim of solving the problems set forth above. Through this investigation, the inventor discovered that by using at least ether-modified silicone oil as silicone oil, it is possible to provide a vinyl chloride resin molded product with good surface lubricity while also inhibiting formation of voids in a foamed polyurethane molded product laminated with the vinyl chloride resin molded product. In this manner, the inventor completed the present disclosure.

Specifically, the present disclosure aims to advantageously solve the problems set forth above by disclosing a vinyl chloride resin composition comprising a vinyl chloride resin, a plasticizer, and silicone oil, wherein the silicone oil includes at least ether-modified silicone oil. When a vinyl chloride resin composition contains a vinyl chloride resin, a plasticizer, and specific silicone oil as set forth above, a vinyl chloride resin molded product obtained through molding of the composition can be provided with excellent surface lubricity, and formation of voids in a foamed polyurethane molded product when the vinyl chloride resin molded product is laminated therewith can be inhibited.

In the presently disclosed vinyl chloride resin composition, the ether-modified silicone oil preferably has an HLB value of 3 or less. Surface lubricity of a vinyl chloride resin molded product obtained through molding of the vinyl chloride resin composition can be further improved when the HLB value of the ether-modified silicone oil is not more than the upper limit set forth above. As a result, it is possible to achieve a better balance of surface lubricity of a vinyl chloride resin molded product and inhibition of void formation in a foamed polyurethane molded product laminated with the vinyl chloride resin molded product.

The term "HLB value" as used in the present disclosure refers to hydrophile-lipophile balance, and is an index that is expressed in accordance with the Griffin method by the following formula (3):

$$\text{HLB value} = 20 \times (\text{Sum total of formula weight of chain ethylene oxide structure/Molecular weight}) \quad (3)$$

and that indicates the degree of hydrophilicity and lipophilicity. The term "chain ethylene oxide structure" as used in the present disclosure refers to an ethylene oxide structure having a chain form such as described in detail further below and is not inclusive of an ethylene oxide structure having a cyclic form such as an epoxy group, for example.

In the presently disclosed vinyl chloride resin composition, the silicone oil preferably further includes at least one of fatty acid amide-modified silicone oil and unmodified silicone oil. Surface lubricity of a vinyl chloride resin molded product obtained through molding of the vinyl chloride resin composition can be further improved when the vinyl chloride resin composition further contains fatty acid amide-modified silicone oil and/or unmodified silicone oil in addition to ether-modified silicone oil. As a result, it is possible to achieve a better balance of surface lubricity of a vinyl chloride resin molded product and inhibition of void formation in a foamed polyurethane molded product laminated with the vinyl chloride resin molded product.

In the presently disclosed vinyl chloride resin composition, content of the ether-modified silicone oil is preferably higher than total content of the fatty acid amide-modified silicone oil and the unmodified silicone oil. This is because in a case in which ether-modified silicone oil is used in combination with fatty acid amide-modified silicone oil and/or unmodified silicone oil, surface lubricity of a vinyl chloride resin molded product obtained through molding of the vinyl chloride resin composition can favorably be maintained while further inhibiting formation of voids in a foamed polyurethane molded product laminated with the vinyl chloride resin molded product by setting the content of the ether-modified silicone oil in the silicone oil as higher than the total content of the fatty acid amide-modified silicone oil and the unmodified silicone oil in the silicone oil.

In a case in which ether-modified silicone oil is used in combination with fatty acid amide-modified silicone oil and/or unmodified silicone oil in the presently disclosed vinyl chloride resin composition, the ether-modified silicone oil preferably has an HLB value of 4 or more. This is because in a case in which ether-modified silicone oil is used in combination with fatty acid amide-modified silicone oil and/or unmodified silicone oil, good surface lubricity of a vinyl chloride resin molded product obtained through molding of the vinyl chloride resin composition can be maintained while further inhibiting formation of voids in a foamed polyurethane molded product laminated with the vinyl chloride resin molded product by using ether-modified silicone oil having an HLB value that is at least the lower limit set forth above.

In the presently disclosed vinyl chloride resin composition, it is preferable that the ether-modified silicone oil has an ether group introduced to one or more of a main chain including siloxane linkages, a side chain of the main chain, and a terminal of the main chain, and the ether group has a structure represented by a general formula (1):

$$—(C_2H_4O)_x—\qquad(1)$$

where x is a natural number of 1 or more, and a structure represented by a general formula (2):

$$—(C_3H_6O)_y—\qquad(2)$$

where y is a natural number of 1 or more, and does not include an unsaturated bond. This is because surface lubricity of a vinyl chloride resin molded product obtained through molding of the vinyl chloride resin composition and inhibition of void formation in a foamed polyurethane molded product laminated with the vinyl chloride resin molded product can be achieved in an even better balance when the specific ether group set forth above has been introduced into the ether-modified silicone oil.

In the presently disclosed vinyl chloride resin composition, the ether-modified silicone oil preferably has a kinematic viscosity of 65 cSt or more. This is because surface lubricity of a vinyl chloride resin molded product obtained using the vinyl chloride resin composition can favorably be maintained while further inhibiting formation of voids in a foamed polyurethane molded product laminated with the vinyl chloride resin molded product when the kinematic viscosity of the ether-modified silicone oil is at least the lower limit set forth above.

The "kinematic viscosity" referred to in the present disclosure can be measured in accordance with ASTM D 445-46T at 25° C. by a method described in the EXAMPLES section. Moreover, in a case in which a mixture of two or more types of ether-modified silicone oil is used, the "kinematic viscosity" can be measured as a value for the entire mixture.

In the presently disclosed vinyl chloride resin composition, content of the plasticizer is preferably 70 parts by mass or more per 100 parts by mass of the vinyl chloride resin. This is because a vinyl chloride resin molded product can favorably be obtained using the vinyl chloride resin composition when the content of the plasticizer is at least the lower limit set forth above.

The presently disclosed vinyl chloride resin composition is preferably used for powder molding. By using the vinyl chloride resin composition for powder molding, the vinyl chloride resin composition can be more suitably used in formation of a vinyl chloride resin molded product for use in an automobile interior component such as an automobile instrument panel, for example.

Moreover, the presently disclosed vinyl chloride resin composition is preferably used for powder slush molding. By using the vinyl chloride resin composition for powder slush molding, the vinyl chloride resin composition can be even more suitably used in formation of a vinyl chloride resin molded product for use in an automobile interior component such as an automobile instrument panel, for example.

Moreover, the present disclosure aims to advantageously solve the problems set forth above by disclosing a vinyl chloride resin molded product obtained through molding of any one of the vinyl chloride resin compositions set forth above. By using the vinyl chloride resin composition set forth above to form a vinyl chloride resin molded product, the vinyl chloride resin molded product can be provided with good surface lubricity while also favorably inhibiting formation of voids in a foamed polyurethane molded product laminated with the vinyl chloride resin molded product.

The presently disclosed vinyl chloride resin molded product is preferably for a surface skin of an automobile instrument panel. When the presently disclosed vinyl chloride resin molded product is used as a surface skin of an automobile instrument panel, it is possible to produce an automobile instrument panel that has favorably suppressed surface stickiness and that is favorably lined with a foamed polyurethane molded product.

Furthermore, the present disclosure aims to advantageously solve the problems set forth above by disclosing a laminate comprising a foamed polyurethane molded product and any one of the vinyl chloride resin molded products set forth above. When a foamed polyurethane molded product and the vinyl chloride resin molded product set forth above are used to obtain a laminate, the foamed polyurethane molded product and the vinyl chloride resin molded product can favorably be laminated, and excellent surface lubricity can be achieved, which makes it possible to obtain a laminate that is suitable as an automobile interior material, for example.

Advantageous Effect

According to the present disclosure, it is possible to provide a vinyl chloride resin molded product that has excellent surface lubricity and can inhibit formation of voids in a foamed polyurethane molded product laminated therewith, and also to provide a vinyl chloride resin composition that enables production of this vinyl chloride resin molded product.

Moreover, according to the present disclosure, it is possible to provide a laminate that includes a foamed polyurethane molded product and a vinyl chloride resin molded product, has excellent surface lubricity, and in which formation of voids has been suppressed.

DETAILED DESCRIPTION

The following provides a detailed description of embodiments of the present disclosure.

The presently disclosed vinyl chloride resin composition may be used to obtain the presently disclosed vinyl chloride resin molded product, for example. Moreover, a vinyl chloride resin molded product obtained through molding of the presently disclosed vinyl chloride resin composition may be used in production of the presently disclosed laminate including this vinyl chloride resin molded product, for example. Furthermore, the presently disclosed vinyl chloride resin molded product can suitably be used as an automobile interior material such as a surface skin of an automobile instrument panel or other automobile interior component, for example.

(Vinyl Chloride Resin Composition)

The presently disclosed vinyl chloride resin composition contains a vinyl chloride resin, a plasticizer, and silicone oil. A feature of the presently disclosed vinyl chloride resin composition is that the silicone oil includes at least ether-modified silicone oil. In addition to these components, the presently disclosed vinyl chloride resin composition may optionally further contain other types of silicone oil such as fatty acid amide-modified silicone oil and unmodified silicone oil, additives, and so forth. As a result of the presently disclosed vinyl chloride resin composition containing the specific components set forth above, a vinyl chloride resin molded product having excellent surface lubricity can be obtained using the presently disclosed vinyl chloride resin composition. Moreover, when a foamed polyurethane molded product is laminated with a vinyl chloride resin molded product obtained through molding of the presently disclosed vinyl chloride resin composition, the formation of voids in the foamed polyurethane molded product can be inhibited, and a laminate including the vinyl chloride resin molded product and the foamed polyurethane molded product can favorably be produced.

<Vinyl Chloride Resin>

The vinyl chloride resin contained in the vinyl chloride resin composition may, for example, include one type or two or more types of vinyl chloride resin particles, and may optionally further include one type or two or more types of vinyl chloride resin fine particles. The vinyl chloride resin preferably includes at least vinyl chloride resin particles, more preferably includes vinyl chloride resin particles and vinyl chloride resin fine particles, and even more preferably includes one type of vinyl chloride resin particles and two types of vinyl chloride resin fine particles.

The present description uses the term "resin particles" to refer to particles with a particle diameter of 30 μm or more, and the term "resin fine particles" to refer to particles with a particle diameter of less than 30 μm.

The vinyl chloride resin may be produced by any production method known in the art such as suspension polymerization, emulsion polymerization, solution polymerization, or bulk polymerization.

<<Chemical Composition>>

Examples of the vinyl chloride resin include homopolymers composed of vinyl chloride monomer units and also vinyl chloride copolymers preferably comprising 50 mass % or more of vinyl chloride monomer units, and more preferably 70 mass % or more of vinyl chloride monomer units. Specific examples of monomers (comonomers) that can be copolymerized with vinyl chloride monomer to obtain a vinyl chloride copolymer include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl 3-chloro-2-oxypropyl ether and allyl glycidyl ether; unsaturated carboxylic acids, esters of unsaturated carboxylic acids, and acid anhydrides of unsaturated carboxylic acids such as acrylic acid, maleic acid, itaconic acid, 2-hydroxyethyl acrylate, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoic acid salts and diallyldimethylammonium chloride. The above examples of monomers are merely some of the comonomers that can be used. Further examples of comonomers that can be used include various monomers listed in pages 75 to 104 of "Polyvinyl chloride" edited by the Vinyl Section of the Kinki Chemical Society Japan and published by Nikkan Kogyo Shimbun, Ltd. (1988). One of these comonomers may be used individually, or two or more of these comonomers may be used in combination. Note that examples of the vinyl chloride resin also include resins formed by graft polymerization of (1) vinyl chloride or (2) vinyl chloride and a comonomer such as described above with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of the vinyl chloride resin particles is preferably 500 or more, more preferably 1,000 or more, and even more preferably 1,500 or more, and is preferably 5,000 or less, more preferably 3,000 or less, even more preferably 2,500 or less, and further preferably 2,000 or less. When the average degree of polymerization of the vinyl chloride resin particles is at least any of the lower limits set forth above, sufficient physical strength of a vinyl chloride resin molded product obtained through molding of the vinyl chloride resin composition can be ensured while also providing good tensile elongation at low temperature that is suitable in a case in which the vinyl chloride resin molded product is to be used as a surface skin of an automobile instrument panel, for example. Moreover, when the average degree of polymerization of the vinyl chloride resin particles is not more than any of the upper limits set forth above, meltability of the vinyl chloride resin composition can be improved, and surface smoothness can also be improved.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition can be further improved when the average particle diameter of the vinyl chloride resin particles is at least any of the lower limits set forth above. Moreover, meltability of the vinyl chloride resin composition further improves and surface smoothness of a vinyl chloride resin molded product formed using the composition can be further improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Percentage Content]

The percentage content of the vinyl chloride resin particles in 100 mass %, in total, of the vinyl chloride resin is preferably 70 mass % or more, more preferably 80 mass % or more, and may be 100 mass %, and is preferably 95 mass % or less, and more preferably 90 mass % or less. When the percentage content of the vinyl chloride resin particles in the vinyl chloride resin is at least any of the lower limits set forth above, sufficient physical strength of a vinyl chloride resin molded product obtained through molding of the vinyl chloride resin composition can be ensured while also further improving tensile elongation at low temperature. Moreover, when the percentage content of the vinyl chloride resin particles in the vinyl chloride resin is not more than any of the upper limits set forth above, powder fluidity of the vinyl chloride resin composition can be further improved.

<<Vinyl Chloride Resin Fine Particles>>

The vinyl chloride resin fine particles in the vinyl chloride resin composition normally function as a dusting agent (powder fluidity modifier). The vinyl chloride resin fine particles are preferably produced by emulsion polymerization.

[Average Degree of Polymerization]

The average degree of polymerization of the vinyl chloride resin fine particles is preferably 500 or more, and more preferably 700 or more, and is preferably 5,000 or less, more preferably 3,000 or less, and even more preferably 2,500 or less. In a case in which two types of vinyl chloride resin fine particles having different average degrees of polymerization are used in combination as dusting agents, for example, an average value of the average degrees of polymerization of the used dusting agents is preferably 1,000 or more, and is preferably less than 1,500. When the average degree of polymerization of vinyl chloride resin fine particles used as a dusting agent is at least any of the lower limits set forth above, powder fluidity of the vinyl chloride resin composition improves, and tensile elongation at low temperature of a molded product obtained using the composition improves. Moreover, when the average degree of polymerization of the vinyl chloride resin fine particles is not more than any of the upper limits set forth above, meltability of the vinyl chloride resin composition further improves, and surface smoothness of a vinyl chloride resin molded product obtained through molding of the composition further improves.

[Average Particle Diameter]

The average particle diameter of the vinyl chloride resin fine particles is normally less than 30 μm, and preferably 10 μm or less, and is preferably 0.1 μm or more. When the average particle diameter of the vinyl chloride resin fine particles is at least the lower limit set forth above, the vinyl chloride resin fine particles are not too small to function as a dusting agent, for example, and the vinyl chloride resin composition can display even better powder fluidity. Moreover, when the average particle diameter of the vinyl chloride resin fine particles is not more than any of the upper limits set forth above, meltability of the vinyl chloride resin composition increases, and smoothness of a molded product formed therewith can be further improved.

[Percentage Content]

The percentage content of the vinyl chloride resin fine particles in 100 mass % of the vinyl chloride resin is preferably 5 mass % or more, and more preferably 10 mass % or more, and is preferably 30 mass % or less, more preferably 20 mass % or less, and may be 0 mass %. This is because powder fluidity of the vinyl chloride resin composition further improves when the percentage content of the vinyl chloride resin fine particles in the vinyl chloride resin is at least any of the lower limits set forth above. Moreover, physical strength and tensile elongation at low temperature of a vinyl chloride resin molded product obtained through molding of the vinyl chloride resin composition can be further increased when the percentage content of the vinyl chloride resin fine particles in the vinyl chloride resin is not more than any of the upper limits set forth above.

<Plasticizer>

The presently disclosed vinyl chloride resin composition is required to further contain a plasticizer. A vinyl chloride resin molded product cannot favorably be obtained using the vinyl chloride resin composition if the vinyl chloride resin composition does not contain a plasticizer.

<<Content>>

The content of the plasticizer per 100 parts by mass of the vinyl chloride resin is preferably 70 parts by mass or more, more preferably 80 parts by mass or more, even more preferably 92 parts by mass or more, and further preferably 97 parts by mass or more, and is preferably 200 parts by mass or less, more preferably 150 parts by mass or less, and even more preferably 100 parts by mass or less. When the content of the plasticizer is at least any of the lower limits set forth above, the vinyl chloride resin composition can be provided with excellent flexibility, which facilitates processing of the vinyl chloride resin composition to obtain a vinyl chloride resin molded product, for example, and the obtained vinyl chloride resin molded product can be provided with good tensile elongation at low temperature. Moreover, when the content of the plasticizer is not more than any of the upper limits set forth above, stickiness of the surface of an obtained vinyl chloride resin molded product can be further suppressed, and surface lubricity of the vinyl chloride resin molded product can be further increased.

<<Type>>

Specific examples of plasticizers that can be used include the following primary plasticizers and secondary plasticizers.

Examples of so-called primary plasticizers include:

linear trimellitic acid esters in which ester-forming alkyl groups are linear such as trimethyl trimellitate, triethyl trimellitate, tri-n-propyl trimellitate, tri-n-butyl trimellitate, tri-n-pentyl trimellitate, tri-n-hexyl trimellitate, tri-n-heptyl trimellitate, tri-n-octyl trimellitate, tri-n-nonyl trimellitate, tri-n-decyl trimellitate, tri-n-undecyl trimellitate, tri-n-dodecyl trimellitate, tri-n-tridecyl trimellitate, tri-n-tetradecyl trimellitate, tri-n-pentadecyl trimellitate, tri-n-hexadecyl trimellitate, tri-n-heptadecyl trimellitate, tri-n-stearyl trimellitate, and tri-n-alkyl trimellitates (alkyl groups in the same molecule of the tri-n-alkyl trimellitate may have different carbon numbers) [note that these trimellitic acid esters may be composed of a single compound or may be a mixture];

branched trimellitic acid esters in which ester-forming alkyl groups are branched such as tri-i-propyl trimellitate, tri-i-butyl trimellitate, tri-i-pentyl trimellitate, tri-i-hexyl trimellitate, tri-i-heptyl trimellitate, tri-i-octyl trimellitate, tri(2-ethylhexyl) trimellitate, tri-i-nonyl trimellitate, tri-i-decyl trimellitate, tri-i-undecyl trimellitate, tri-i-dodecyl trimellitate, tri-i-tridecyl trimellitate, tri-i-tetradecyl trimellitate, tri-i-pentadecyl trimellitate, tri-i-hexadecyl trimellitate, tri-i-heptadecyl trimellitate, tri-i-octadecyl trimellitate, and trialkyl trimellitates (alkyl groups in the same molecule of the trialkyl trimellitate may have different carbon numbers) [note that these trimellitic acid esters may be composed of a single compound or may be a mixture];

linear pyromellitic acid esters in which ester-forming alkyl groups are linear such as tetramethyl pyromellitate, tetraethyl pyromellitate, tetra-n-propyl pyromellitate, tetra-n-butyl pyromellitate, tetra-n-pentyl pyromellitate, tetra-n-hexyl pyromellitate, tetra-n-heptyl pyromellitate, tetra-n-octyl pyromellitate, tetra-n-nonyl pyromellitate, tetra-n-decyl pyromellitate, tetra-n-undecyl pyromellitate, tetra-n-dodecyl pyromellitate, tetra-n-tridecyl pyromellitate, tetra-n-tetradecyl pyromellitate, tetra-n-pentadecyl pyromellitate, tetra-n-hexadecyl pyromellitate, tetra-n-heptadecyl pyromellitate, tetra-n-stearyl pyromellitate, and tetra-n-alkyl pyromellitates (alkyl groups in the same molecule of the tetra-n-alkyl pyromellitate may have different carbon numbers) [note that these pyromellitic acid esters may be composed of a single compound or may be a mixture];

branched pyromellitic acid esters in which ester-forming alkyl groups are branched such as tetra-i-propyl pyromellitate, tetra-i-butyl pyromellitate, tetra-i-pentyl pyromellitate, tetra-i-hexyl pyromellitate, tetra-i-heptyl pyromellitate, tetra-i-octyl pyromellitate, tetra(2-ethylhexyl) pyromellitate, tetra-i-nonyl pyromellitate, tetra-i-decyl pyromellitate, tetra-i-undecyl pyromellitate, tetra-i-dodecyl pyromellitate, tetra-i-tridecyl pyromellitate, tetra-i-tetradecyl pyromellitate, tetra-i-pentadecyl pyromellitate, tetra-i-hexadecyl pyromellitate, tetra-i-heptadecyl pyromellitate, tetra-i-octadecyl pyromellitate, and tetraalkyl pyromellitates (alkyl groups in the same molecule of the tetraalkyl pyromellitate may have different carbon numbers) [note that these pyromellitic acid esters may be composed of a single compound or may be a mixture];

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives (excluding 12-hydroxystearic acid and esters thereof) such as n-butyl stearate and diethylene glycol distearate;

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris (chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebis(thioglycolate);

glycerin derivatives such as glycerol monoacetate, glycerol triacetate, and glycerol tributyrate;

epoxy derivatives such as diisodecyl epoxy hexahydrophthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

One of these plasticizers may be used individually, or two or more primary plasticizers, secondary plasticizers, or the like may be used in combination. In a situation in which a secondary plasticizer is used, a primary plasticizer of equivalent or greater mass is preferably used in combination with the secondary plasticizer.

Of the plasticizers listed above, the use of a trimellitic acid ester and/or a pyromellitic acid ester is preferable, the use of a trimellitic acid ester is more preferable, the use of a linear trimellitic acid ester is even more preferable, and the use of a linear trimellitic acid ester including at least two alkyl group that differ in terms of carbon number in molecules thereof is further preferable from a viewpoint of improving molding properties of the vinyl chloride resin composition. The alkyl groups preferably each have a carbon number of 8 to 10, and are more preferably each an n-octyl group or an n-decyl group. Moreover, it is preferable that epoxidized soybean oil is used in combination with a trimellitic acid ester such as described above.

<Silicone Oil>

A feature of the silicone oil contained in the presently disclosed vinyl chloride resin composition is that the silicone oil includes at least ether-modified silicone oil. In general, a plasticizer tends to act as a cause of stickiness of a surface of a molded product. However, even in a case in which a vinyl chloride resin molded product is obtained through molding of a vinyl chloride resin composition that contains a plasticizer, the vinyl chloride resin molded product can be provided with good surface lubricity and formation of voids in a foamed polyurethane molded product laminated with the vinyl chloride resin molded product can favorably be inhibited through inclusion of ether-modified silicone oil in the vinyl chloride resin composition.

The silicone oil contained in the presently disclosed vinyl chloride resin composition preferably further contains at least one of fatty acid amide-modified silicone oil and unmodified silicone oil in addition to the ether-modified silicone oil. Specifically, although the presently disclosed vinyl chloride resin composition may contain just ether-modified silicone oil as the silicone oil, a case in which the presently disclosed vinyl chloride resin composition contains ether-modified silicone oil and fatty acid amide-modified silicone oil, a case in which the presently disclosed vinyl chloride resin composition contains ether-modified silicone oil and unmodified silicone oil, and a case in which the presently disclosed vinyl chloride resin composition contains ether-modified silicone oil, fatty acid amide-modified silicone oil, and unmodified silicone oil are preferable. Moreover, the presently disclosed vinyl chloride resin composition may further contain any other type of silicone oil in addition to the types of silicone oil described above.

Note that a good balance of improving surface lubricity and inhibiting void formation through inclusion of the ether-modified silicone oil can be achieved even more effectively in a case in which the content of the plasticizer is comparatively high, and, more specifically, in a case in which the content of the plasticizer is 70 parts by mass or more per 100 parts by mass of the vinyl chloride resin.

Note that although no specific limitations are made, "silicone oil" such as ether-modified silicone oil, fatty acid amide-modified silicone oil, and unmodified silicone oil referred to in the present disclosure may typically have fluidity at normal temperature and normal pressure and be in a liquid form or a semi-solid form (e.g., a paste form), for example.

In the present disclosure, "normal temperature" indicates 23° C. and "normal pressure" indicates 1 atm (absolute pressure).

<<Ether-Modified Silicone Oil>>

The ether-modified silicone oil normally has an ether group introduced to one or more of a main chain including siloxane linkages (—Si—O—Si—), a side chain of the main chain, and a terminal of the main chain. In a case in which an ether group is introduced into the main chain, the ether group is block bonded partway along the main chain. In a case in which an ether group is introduced to a terminal, an ether group may be introduced to one terminal or an ether group may be introduced to each terminal. Moreover, the ether-modified silicone oil may also have a substituent other than an ether group introduced to the main chain, a side chain of the main chain, and/or a terminal of the main chain.

It is preferable that an ether group is introduced to at least a side chain in the ether-modified silicone oil.

[Ether Group]

The ether group may, for example, be a substituent including one chain alkylene oxide structure or a plurality of such structures. Specifically, the ether group may, for example, be a substituent including only a chain ethylene oxide structure represented by the following general formula (1):

$$-(C_2H_4O)_x-\quad (1)$$

where x is a natural number of 1 or more (also referred to as a "polyethylene oxide group" in a case in which x in formula (1) is a natural number of 2 or more); a substituent including, in any ratio, this chain ethylene oxide structure and a chain propylene oxide structure represented by the following general formula (2):

$$-(C_3H_6O)_y-\quad (2)$$

where y is a natural number of 1 or more (also referred to as a "polypropylene oxide group" in a case in which y in formula (2) is a natural number of 2 or more); a substituent that further includes any organic structures (indicated below by "R" and "R'") other than a chain alkylene oxide structure in addition to the chain ethylene oxide structure (for example, —R—$(C_2H_4O)_x$—R'); and a substituent that further includes any organic structures R and R' in addition to chain alkylene oxide structures such as the chain ethylene oxide structure and the chain propylene oxide structure (for example, —R—$(C_2H_4O)_x(C_3H_6O)_y$—R'). Note that a case in which only one of the organic structures R and R' in —R—$(C_2H_4O)_x$—R' or —R—$(C_2H_4O)_x(C_3H_6O)_y$—R' is present, for example, is also permitted.

The ether group preferably includes at least a chain ethylene oxide structure, more preferably includes a chain ethylene oxide structure and a chain propylene oxide structure, and even more preferably includes a plurality of chain ethylene oxide structures and chain propylene oxide structures from a viewpoint of increasing surface lubricity of a vinyl chloride resin molded product while also further inhibiting formation of voids in a foamed polyurethane molded product laminated with the vinyl chloride resin molded product, though the reason for this is not clear. It is further preferable that the ether group does not include an unsaturated bond from a viewpoint of obtaining excellent heat aging resistance.

[Other Substituents]

Examples of other substituents that may be introduced into the ether-modified silicone oil include, but are not specifically limited to, alkyl groups (—$C_aH_{2a+1}$, where a is any natural number) and aralkyl groups (for example, —$CH_2$—$CH(CH_3)$—$C_6H_5$, where $C_6H_5$ is a phenyl group).

[HLB Value]

In a case in which the ether-modified silicone oil is not used in combination with fatty acid amide-modified silicone oil and/or unmodified silicone oil (described below in detail), an HLB value of the ether-modified silicone oil is preferably 3 or less, more preferably 2.5 or less, and even more preferably 2.2 or less, and is preferably 1 or more, more preferably 1.5 or more, and even more preferably 1.8 or more. When the HLB value of the ether-modified silicone oil is at least any of the lower limits set forth above in a case in which the ether-modified silicone oil is not used in combination with fatty acid amide-modified silicone oil and/or unmodified silicone oil, the ether-modified silicone oil displays polarity, and formation of voids in a process of laminating a foamed polyurethane molded product can be further inhibited. Moreover, when the HLB value of the ether-modified silicone oil is not more than any of the upper limits set forth above in a case in which the ether-modified silicone oil is not used in combination with fatty acid amide-modified silicone oil and/or unmodified silicone oil, the ether-modified silicone oil does not have excessive polarity, and good surface lubricity is displayed. Furthermore, when the HLB value of the ether-modified silicone oil is within any of the ranges set forth above in a case in which the ether-modified silicone oil is not used in combination with fatty acid amide-modified silicone oil and/or unmodified silicone oil, good surface lubricity of a vinyl chloride resin molded product obtained through molding of the vinyl chloride resin composition and inhibition of void formation in a foamed polyurethane molded product can both be achieved to higher levels.

Moreover, in a case in which the ether-modified silicone oil is used in combination with fatty acid amide-modified silicone oil and/or unmodified silicone oil (described below in detail), the HLB value of the ether-modified silicone oil is preferably 4 or more, more preferably 5 or more, and even more preferably 5.8 or more, and is preferably 10 or less, more preferably 8 or less, and even more preferably 6.2 or less. When the HLB value of the ether-modified silicone oil is at least any of the lower limits set forth above in a case in which the ether-modified silicone oil is used in combination with fatty acid amide-modified silicone oil and/or unmodified silicone oil, the ether-modified silicone oil displays comparatively high polarity. Moreover, void formation is further inhibited in a process of laminating a foamed polyurethane molded product with a vinyl chloride resin molded product obtained through molding of the vinyl chloride resin composition. In general, surface lubricity of a vinyl chloride resin molded product tends to decrease in a situation in which ether-modified silicone oil having an HLB value of 4 or more is used. However, better surface lubricity can be achieved through the additional use of fatty acid amide-modified silicone oil and/or unmodified silicone oil (described below in detail). Furthermore, when the HLB value of the ether-modified silicone oil is not more than any of the upper limits set forth above in a case in which the ether-modified silicone oil is used in combination with fatty acid amide-modified silicone oil and/or unmodified silicone oil, the ether-modified silicone oil does not have excessive polarity, and better surface lubricity can be displayed.

The HLB value is an index that can be expressed by the previously presented formula (3).

[Kinematic Viscosity]

The kinematic viscosity of the ether-modified silicone oil at 25° C. is preferably 65 cSt or more, and more preferably 68 cSt or more, and is preferably 4,000 cSt or less, more preferably 3,000 cSt or less, even more preferably 2,000 cSt or less, and further preferably 1,500 cSt or less. When the kinematic viscosity of the ether-modified silicone oil is at least any of the lower limits set forth above, a defoaming effect can be reduced and surface lubricity of a vinyl chloride resin molded product obtained through molding of the vinyl chloride resin composition can be more favorably ensured while also further inhibiting void formation in a process of laminating a foamed polyurethane molded product. Moreover, when the kinematic viscosity of the ether-modified silicone oil is not more than any of the upper limits set forth above, handleability of the ether-modified silicone oil is excellent.

Additionally, the kinematic viscosity of the ether-modified silicone oil is particularly preferably 700 cSt or less in a case in which the ether-modified silicone oil is not used in combination with fatty acid amide-modified silicone oil and/or unmodified silicone oil. This is because surface lubricity of a vinyl chloride resin molded product obtained through molding of the vinyl chloride resin composition can be further increased when the kinematic viscosity of the ether-modified silicone oil is not more than the upper limit set forth above in a case in which the ether-modified silicone oil is not used in combination with fatty acid amide-modified silicone oil and/or unmodified silicone oil.

[Content of Ether-Modified Silicone Oil]

The content of the ether-modified silicone oil per 100 parts by mass of the vinyl chloride resin is preferably 0.01 parts by mass or more, more preferably 0.1 parts by mass or more, and even more preferably 0.15 parts by mass or more, and is preferably 1.5 parts by mass or less, more preferably 1.0 parts by mass or less, even more preferably 0.5 parts by mass or less, and further preferably 0.4 parts by mass or less. When the content of the ether-modified silicone oil is at least any of the lower limits set forth above, stickiness of the surface of a vinyl chloride resin molded product can be sufficiently reduced, surface lubricity of the vinyl chloride resin molded product can be further improved, and formation of voids in a foamed polyurethane molded product that is laminated therewith can be further inhibited. Moreover, when the content of the ether-modified silicone oil is not more than any of the upper limits set forth above, staining of a mold or the like for molding due to excessive ether-modified silicone oil can be inhibited even in continuous molding of vinyl chloride resin molded products, for example.

The content of the ether-modified silicone oil per 100 parts by mass of the plasticizer is preferably 0.01 parts by mass or more, more preferably 0.1 parts by mass or more, and even more preferably 0.15 parts by mass or more, and is preferably 1.5 parts by mass or less, more preferably 1.0 parts by mass or less, even more preferably 0.5 parts by mass or less, and further preferably 0.4 parts by mass or less. Although a plasticizer generally tends to act as a cause of stickiness of the surface of a molded product, when the content of the ether-modified silicone oil is at least any of the lower limits set forth above, stickiness of the surface of a vinyl chloride resin molded product can be sufficiently reduced, surface lubricity of the vinyl chloride resin molded product can be further improved, and void formation in a foamed polyurethane molded product laminated therewith can be further inhibited. Moreover, when the content of the ether-modified silicone oil is not more than any of the upper limits set forth above, staining of a mold or the like for molding due to excessive ether-modified silicone oil can be inhibited even in continuous molding of vinyl chloride resin molded products, for example.

In a case in which the ether-modified silicone oil is used in combination with fatty acid amide-modified silicone oil and/or unmodified silicone oil (described below in detail), the content of the ether-modified silicone oil in the silicone oil is preferably higher than the total content of the fatty acid amide-modified silicone oil and the unmodified silicone oil in the silicone oil. Moreover, in a case in which the ether-modified silicone oil is used in combination with fatty acid amide-modified silicone oil and/or unmodified silicone oil, the content of the ether-modified silicone oil is preferably at least 1.3 times, and more preferably at least 1.6 times the total content of the fatty acid amide-modified silicone oil and the unmodified silicone oil, and is preferably not more than 5 times, and more preferably not more than 3 times the total content of the fatty acid amide-modified silicone oil and the unmodified silicone oil. This is because void formation in a foamed polyurethane molded product that is laminated can be further inhibited when the content of the ether-modified silicone oil is at least any of the lower limits set forth above. Moreover, surface lubricity of a vinyl chloride resin molded product obtained through molding of the vinyl chloride resin composition can be improved when the content of the ether-modified silicone oil is not more than any of the upper limits set forth above.

<<Fatty Acid Amide-Modified Silicone Oil>>

The fatty acid amide-modified silicone oil that may be further contained in the presently disclosed vinyl chloride resin composition as the silicone oil in addition to the previously described ether-modified silicone oil is normally obtained through introduction of an acid amide group represented by general formula (4):

—NHCO—R″    (4)

where R″ is a hydrocarbon group. The fatty acid amide-modified silicone oil is preferably obtained through introduction of a fatty acid amide group represented by general formula (5):

—R‴—NHCO—R″    (5)

where R″ and R‴ are identical or different hydrocarbon groups. By using the previously described ether-modified silicone oil and the fatty acid amide-modified silicone oil in combination as the silicone oil, surface lubricity of a vinyl chloride resin molded product obtained through molding of the vinyl chloride resin composition and inhibition of void formation in a foamed polyurethane molded product that is laminated therewith can both be achieved to higher levels.

With regard to the fatty acid amide-modified silicone oil, the carbon number of at least one of R″ and R‴ in formulae (4) and (5) is preferably 5 or more, and more preferably 12 or more, and is preferably 24 or less, and more preferably 18 or less. Moreover, the carbon number of R″ is even more preferably 12 or more, and is even more preferably 18 or less. In other words, the fatty acid amide-modified silicone oil is more preferably higher fatty acid amide-modified silicone oil. In the case of a structure such as set forth above, the fatty acid amide-modified silicone oil has comparatively low polarity compared to the previously described ether-modified silicone oil used therewith, which has comparatively high polarity. Moreover, surface lubricity of a vinyl chloride resin molded product obtained through molding of the vinyl chloride resin composition can be further improved while also sufficiently inhibiting void formation in a foamed polyurethane molded product laminated therewith.

[Content of Fatty Acid Amide-Modified Silicone Oil]

The content of the fatty acid amide-modified silicone oil per 100 parts by mass of the vinyl chloride resin is preferably 0.005 parts by mass or more, more preferably 0.01 parts by mass or more, and even more preferably 0.05 parts by mass or more, and is preferably 1.0 parts by mass or less, more preferably 0.3 parts by mass or less, and even more preferably 0.15 parts by mass or less. The additional use of fatty acid amide-modified silicone oil with a content that is at least any of the lower limits set forth above can further reduce stickiness of the surface of a vinyl chloride resin molded product while also sufficiently inhibiting void formation in a foamed polyurethane molded product laminated therewith. Moreover, the additional use of fatty acid amide-modified silicone oil with a content that is not more than any of the upper limits set forth above can further inhibit void formation in a foamed polyurethane molded product that is laminated.

The content of the fatty acid amide-modified silicone oil per 100 parts by mass of the plasticizer is preferably 0.005 parts by mass or more, more preferably 0.01 parts by mass or more, and even more preferably 0.05 parts by mass or more, and is preferably 1.0 parts by mass or less, more preferably 0.3 parts by mass or less, and even more preferably 0.15 parts by mass or less. The additional use of fatty acid amide-modified silicone oil with a content that is at least any of the lower limits set forth above can further reduce stickiness of the surface of a vinyl chloride resin molded product while also sufficiently inhibiting void formation in a foamed polyurethane molded product laminated therewith. Moreover, the additional use of fatty acid amide-modified silicone oil with a content that is not more than any of the upper limits set forth above can further inhibit void formation in a foamed polyurethane molded product that is laminated.

<<Unmodified Silicone Oil>>

The presently disclosed vinyl chloride resin composition may further contain unmodified silicone oil in addition to the previously described ether-modified silicone oil as the silicone oil.

The unmodified silicone oil is silicone oil including only a main chain formed by siloxane linkages (—Si—O—Si—). Note that besides oxygen atoms (O), methyl groups (—CH$_3$) and/or ethyl groups (—C$_2$H$_5$) are typically bonded to silicon atoms (Si) in the main chain. The unmodified silicone oil is preferably silicone oil in which only oxygen atoms and methyl groups are bonded to silicon atoms in the main chain and in which substituents other than methyl groups and ethyl groups are not introduced to side chains and terminals of the main chain, and is particularly preferably polydimethylsiloxane.

[Kinematic Viscosity]

The kinematic viscosity of the unmodified silicone oil at 25° C. is preferably 3,000 cSt or more, and more preferably 4,000 cSt or more, and is preferably 1,000,000 cSt or less, more preferably 500,000 cSt or less, and even more preferably 8,000 cSt or less. The additional use of unmodified silicone oil having a kinematic viscosity that is at least any of the lower limits set forth above enables a better balance of surface lubricity of a vinyl chloride resin molded product and inhibition of void formation in a foamed polyurethane molded product laminated therewith. Moreover, handleability of the unmodified silicone oil is better when the kinematic viscosity of the unmodified silicone oil is not more than any of the upper limits set forth above.

[Content of Unmodified Silicone Oil]

The content of the unmodified silicone oil per 100 parts by mass of the vinyl chloride resin is preferably 0.005 parts by mass or more, more preferably 0.01 parts by mass or more, and even more preferably 0.05 parts by mass or more, and is preferably 1.0 parts by mass or less, more preferably 0.3 parts by mass or less, and even more preferably 0.15 parts by mass or less. The additional use of unmodified silicone oil with a content that is at least any of the lower limits set forth above can further reduce stickiness of the surface of a vinyl chloride resin molded product while also sufficiently inhibiting void formation in a foamed polyurethane molded product laminated therewith. Moreover, the additional use of unmodified silicone oil with a content that is not more than any of the upper limits set forth above can further inhibit void formation in a foamed polyurethane molded product that is laminated.

The content of the unmodified silicone oil per 100 parts by mass of the plasticizer is preferably 0.005 parts by mass or more, more preferably 0.01 parts by mass or more, and even more preferably 0.05 parts by mass or more, and is preferably 1.0 parts by mass or less, more preferably 0.3 parts by mass or less, and even more preferably 0.15 parts by mass or less. The additional use of unmodified silicone oil with a content that is at least any of the lower limits set forth above can further reduce stickiness of the surface of a vinyl chloride resin molded product while also sufficiently inhibiting void formation in a foamed polyurethane molded product laminated therewith. Moreover, the additional use of unmodified silicone oil with a content that is not more than any of the upper limits set forth above can further inhibit void formation in a foamed polyurethane molded product that is laminated.

[Total Content of Fatty Acid Amide-Modified Silicone Oil and Unmodified Silicone Oil]

In a case in which the fatty acid amide-modified silicone oil and the unmodified silicone oil described above are both used, the total content of the fatty acid amide-modified silicone oil and the unmodified silicone oil per 100 parts by mass of the vinyl chloride resin is preferably 0.01 parts by mass or more, more preferably 0.03 parts by mass or more, and even more preferably 0.06 parts by mass or more, and is preferably 1.0 parts by mass or less, more preferably 0.3 parts by mass or less, and even more preferably 0.15 parts by mass or less. The additional use of fatty acid amide-modified silicone oil and unmodified silicone oil with a total content that is at least any of the lower limits set forth above can further reduce stickiness of the surface of a vinyl chloride resin molded product. Moreover, the additional use of fatty acid amide-modified silicone oil and unmodified silicone oil with a total content that is not more than any of the upper limits set forth above can further inhibit void formation in a foamed polyurethane molded product that is laminated.

The total content of the fatty acid amide-modified silicone oil and the unmodified silicone oil per 100 parts by mass of the plasticizer is preferably 0.01 parts by mass or more, more preferably 0.03 parts by mass or more, and even more preferably 0.06 parts by mass or more, and is preferably 1.0 parts by mass or less, more preferably 0.3 parts by mass or less, and even more preferably 0.15 parts by mass or less. The additional use of fatty acid amide-modified silicone oil and unmodified silicone oil with a total content that is at least any of the lower limits set forth above can further reduce stickiness of the surface of vinyl chloride resin molded product. Moreover, the additional use of fatty acid amide-modified silicone oil and unmodified silicone oil with a total content that is not more than any of the upper limits set forth above can further inhibit void formation in a foamed polyurethane molded product that is laminated.

<<Content of All Silicone Oil>>

The content of all silicone oil per 100 parts by mass of the vinyl chloride resin is preferably 0.01 parts by mass or more, and more preferably 0.1 parts by mass or more, and is preferably 1 part by mass or less, more preferably 0.5 parts by mass or less, and even more preferably 0.4 parts by mass or less. When the content of all silicone oil is at least any of the lower limits set forth above, stickiness of the surface of a vinyl chloride resin molded product can be further reduced and surface lubricity of the vinyl chloride resin molded product can be further improved while also sufficiently inhibiting void formation in a foamed polyurethane molded product laminated therewith. Moreover, when the content of all silicone oil is not more than any of the upper limits set forth above, staining of the surface of a mold or the like for molding due to excessive silicone oil can be inhibited even in continuous molding of vinyl chloride resin molded products, for example.

The content of all silicone oil per 100 parts by mass of the plasticizer is preferably 0.01 parts by mass or more, and more preferably 0.1 parts by mass or more, and is preferably 1 part by mass or less, more preferably 0.5 parts by mass or less, and even more preferably 0.4 parts by mass or less. A plasticizer generally tends to cause stickiness of the surface of a molded product, but when the content of all silicone oil is at least any of the lower limits set forth above, stickiness of the surface of a vinyl chloride resin molded product can be further reduced and surface lubricity of the vinyl chloride resin molded product can be further improved while also sufficiently inhibiting void formation in a foamed polyurethane molded product laminated therewith. Moreover, when the content of all silicone oil is not more than any of the upper limits set forth above, staining of the surface of a mold or the like for molding due to excessive silicone oil can be inhibited even in continuous molding of vinyl chloride resin molded products, for example.

<Additives>

The presently disclosed vinyl chloride resin composition may further contain various additives besides the components set forth above. Examples of additives that may be used include, but are not specifically limited to, stabilizers such as perchloric acid-treated hydrotalcite, zeolites, β-diketones, and fatty acid metal salts; mold release agents; dusting agents other than the previously described vinyl chloride resin fine particles; and other additives.

<<Perchloric Acid-Treated Hydrotalcite>>

Perchloric acid-treated hydrotalcite that may be contained in the vinyl chloride resin composition can easily be produced as perchloric acid-introduced hydrotalcite by, for example, addition and stirring of hydrotalcite with a dilute aqueous solution of perchloric acid, followed by filtration, dehydration, or drying as necessary. Through this process, at least some of the carbonate anions ($CO_3^{2-}$) in the hydrotalcite are substituted with perchlorate anions ($ClO_4^{-}$) (note that 2 mol of perchlorate anions are substituted per 1 mol of carbonate anions). The molar ratio of hydrotalcite and perchloric acid may be freely set, although a ratio of at least 0.1 mol and not more than 2 mol of perchloric acid per 1 mol of hydrotalcite is typical.

The substitution ratio of carbonate anions in the untreated (unsubstituted without introduction of perchlorate anions) hydrotalcite by perchlorate anions is preferably 50 mol % or more, more preferably 70 mol % or more, and even more preferably 85 mol % or more. Moreover, the substitution ratio of carbonate anions in the untreated (unsubstituted without introduction of perchlorate anions) hydrotalcite by perchlorate anions is preferably 95 mol % or less. As a result of the substitution ratio of carbonate anions in the untreated (unsubstituted without introduction of perchlorate anions) hydrotalcite by perchlorate anions being within any of the ranges set forth above, a vinyl chloride resin molded product can be produced more easily.

Hydrotalcite is a non-stoichiometric compound represented by a general formula: $[Mg_{1-x}Al_x(OH)_2]^{x+}[(CO_3)_{x/2}.mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}.mH_2O]^{x-}$. In the preceding general formula, x represents a number that is more than 0 and not more than 0.33. Natural hydrotalcite is represented by $Mg_6Al_2(OH)_{16}CO_3.4H_2O$. On the other hand, a synthetic hydrotalcite represented by $Mg_{4.5}Al_2(OH)_{13}CO_3.3.5H_2O$ is commercially available. Synthetic hydrotalcite can, for example, be synthesized by a method described in JP S61-174270 A.

Although the content of the perchloric acid-treated hydrotalcite is not specifically limited, the content per 100 parts by mass of the vinyl chloride resin is preferably 0.5 parts by mass or more, and more preferably 1 part by mass or more, and is preferably 7 parts by mass or less, and more preferably 6 parts by mass or less. This is because tensile elongation at low temperature of a vinyl chloride resin molded product obtained through molding of the vinyl chloride resin composition can be more favorably maintained when the content of the perchloric acid-treated hydrotalcite is within any of the ranges set forth above.

<<Zeolite>>

The vinyl chloride resin composition may contain a zeolite as a stabilizer. A zeolite is a compound represented by a general formula: $M_{x/n}\cdot[(AlO_2)_x\cdot(SiO_2)_y]\cdot zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

Although the content of the zeolite is not specifically limited, the content per 100 parts by mass of the vinyl chloride resin is preferably 0.1 parts by mass or more, and is preferably 5 parts by mass or less.

<<β-Diketone>>

A β-diketone can be used to more effectively suppress variation in initial color of a vinyl chloride resin molded product obtained through molding of the vinyl chloride resin composition. Specific examples of β-diketones include dibenzoylmethane, stearoylbenzoylmethane, and palmitoylbenzoylmethane. One of these β-diketones may be used individually, or two or more of these β-diketones may be used in combination.

Although the content of the β-diketone is not specifically limited, the content per 100 parts by mass of the vinyl chloride resin is preferably 0.01 parts by mass or more, and is preferably 5 parts by mass or less.

<<Fatty Acid Metal Salt>>

Any fatty acid metal salt may be contained in the vinyl chloride resin composition without any specific limitations. Of fatty acid metal salts, a metal salt of a monobasic fatty acid is preferable, a metal salt of a monobasic fatty acid having a carbon number of 12 to 24 is more preferable, and a metal salt of a monobasic fatty acid having a carbon number of 15 to 21 is even more preferable. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can form a polyvalent cation, more preferably a metal that can form a divalent cation, even more preferably a metal from periods 3 to 6 of the periodic table that can form a divalent cation, and particularly preferably a metal from period 4 of the periodic table that can form a divalent cation. The fatty acid metal salt is most preferably zinc stearate.

Although the content of the fatty acid metal salt is not specifically limited, the content per 100 parts by mass of the vinyl chloride resin is preferably 0.01 parts by mass or more, and more preferably 0.03 parts by mass or more, and is preferably 5 parts by mass or less, more preferably 1 part by mass or less, and even more preferably 0.5 parts by mass or less. When the content of the fatty acid metal salt is within any of the ranges set forth above, a color difference value of a vinyl chloride resin molded product obtained through molding of the vinyl chloride resin composition can be reduced.

<<Mold Release Agent>>

Examples of mold release agents that may be used include, but are not specifically limited to, lubricants based on 12-hydroxystearic acid such as 12-hydroxystearic acid, esters of 12-hydroxystearic acid, and oligomers of 12-hydroxystearic acid. The content of the mold release agent may be set as at least 0.01 parts by mass and not more than 5 parts by mass per 100 parts by mass of the vinyl chloride resin, but is not specifically limited to this range.

<<Other Dusting Agents>>

Examples of dusting agents other than the previously described vinyl chloride resin fine particles that may be contained in the vinyl chloride resin composition include: inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Of these examples, inorganic fine particles having an average particle diameter of at least 10 nm and not more than 100 nm are preferable.

Although the content of such other dusting agents is not specifically limited, the content per 100 parts by mass of the vinyl chloride resin is preferably 30 parts by mass or less, and more preferably 25 parts by mass or less. One of these other dusting agents may be used individually, or two or more of these other dusting agents may be used in combination. Moreover, these other dusting agents may be used in combination with the previously described vinyl chloride resin fine particles.

<<Other Additives>>

Examples of other additives that may be contained in the vinyl chloride resin composition include, but are not specifically limited to, colorants (pigments), impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, and foaming agents.

Specific examples of colorants (pigments) include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo dye in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the vinyl chloride resin composition. Note that the impact modifier is dispersed as a heterogeneous phase of fine elastic particles in the vinyl chloride resin composition. In the vinyl chloride resin composition, polar groups and chains graft polymerized with the elastic particles are compatible with the vinyl chloride resin and improve impact resistance of a vinyl chloride resin molded product obtained through molding of the vinyl chloride resin composition.

Specific examples of antioxidants include phenolic antioxidants, sulfuric antioxidants, and phosphoric antioxidants such as phosphites.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as fluorocarbons, carbon dioxide gas, water, and volatile hydrocarbon compounds (for example, pentane), and microcapsules containing any of these gaseous foaming agents.

<Production Method of Vinyl Chloride Resin Composition>

The presently disclosed vinyl chloride resin composition can be produced by mixing the components set forth above without any specific limitations.

No specific limitations are placed on the mixing method of the vinyl chloride resin, the plasticizer, the ether-modified silicone oil, and, as necessary, other silicone oils such as fatty acid amide-modified silicone oil and unmodified silicone oil, and various additives. In one example, components other than a dusting agent (inclusive of vinyl chloride resin fine particles) are mixed by dry blending and then the dusting agent is added and mixed therewith. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition is suitable for powder molding, and is more suitable for powder slush molding.

(Vinyl Chloride Resin Molded Product)

A feature of the presently disclosed vinyl chloride resin molded product is that the vinyl chloride resin molded product is obtained through molding of the vinyl chloride resin composition set forth above by any powder molding method, and preferably by a powder slush molding method. As a result of the presently disclosed vinyl chloride resin molded product being obtained through powder molding of the presently disclosed vinyl chloride resin composition, the presently disclosed vinyl chloride resin molded product can be provided with good surface lubricity and can be favorably lined with a foamed polyurethane molded product, for example, while inhibiting formation of voids in the foamed polyurethane molded product. Consequently, the presently disclosed vinyl chloride resin molded product can suitably be used as an automobile interior member. Specifically, the presently disclosed vinyl chloride resin molded product is suitable for use as a surface skin of an automobile interior component such as an automobile instrument panel or a door trim, and is particularly suitable for use as a surface skin of an automobile instrument panel.

<<Molding Method of Vinyl Chloride Resin Molded Product>>

Although the mold temperature in powder slush molding is not specifically limited, the mold temperature is preferably 200° C. or higher, and more preferably 220° C. or higher, and is preferably 300° C. or lower, and more preferably 280° C. or lower.

The following method may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for at least 5 seconds and not more than 30 seconds and, after shaking off any excess vinyl chloride resin composition, is then further left for at least 30 seconds and not more than 3 minutes at a given temperature. The mold is subsequently cooled to a temperature of at least 10° C. and not higher than 60° C., and the resultant vinyl chloride resin molded product is removed from the mold. The removed vinyl chloride resin molded product is obtained as a sheet-like molded product that imitates the shape of the mold, for example.

(Laminate)

The presently disclosed laminate includes a foamed polyurethane molded product and the vinyl chloride resin molded product set forth above. In general, the vinyl chloride resin molded product is lined with the foamed polyurethane molded product, and thus the foamed polyurethane molded product and the vinyl chloride resin molded product are adjacent in the lamination direction. As a result of the presently disclosed laminate including a vinyl chloride resin molded product that is obtained through powder molding of the presently disclosed vinyl chloride resin composition, surface stickiness can be sufficiently reduced, and the foamed polyurethane molded product can favorably be laminated with the vinyl chloride resin molded product while inhibiting formation of voids in the foamed polyurethane molded product. Consequently, the presently disclosed laminate is suitable for use as an automobile interior material of an automobile interior component such as an automobile instrument panel or a door trim, and is particularly suitable for an automobile instrument panel.

The following method, for example, may be used as the lamination method without any specific limitations. In this method, raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the average degree of polymerization and average particle diameter of vinyl chloride resin particles and vinyl chloride resin fine particles; the HLB value and kinematic viscosity of each type of silicone oil; the initial and post-heating (heat aging test) tensile elongation at low temperature of a vinyl chloride resin molded product; the surface lubricity (coefficient of kinetic friction) of a vinyl chloride resin molded product; and the level of void formation in a foamed polyurethane molded product of a laminate.

<Average Degree of Polymerization>

The average degree of polymerization of vinyl chloride resin particles or vinyl chloride resin fine particles was calculated in accordance with JIS K6720-2 by dissolving the vinyl chloride resin particles or vinyl chloride resin fine particles in cyclohexanone and then measuring the viscosity.

<Average Particle Diameter>

The average particle diameter (volume-average particle diameter (μm)) of vinyl chloride resin particles or vinyl chloride resin fine particles was measured in accordance with JIS Z8825. Specifically, the vinyl chloride resin particles or vinyl chloride resin fine particles were dispersed in a water tank, a light diffraction/scattering intensity distribution was measured and analyzed using the following device, and particle diameters and a volume-basis particle diameter distribution were measured to calculate the average particle diameter.

Device: Laser diffraction particle size distribution meter (SALD-2300 produced by Shimadzu Corporation)
Measurement method: Laser diffraction and scattering
Measurement range: 0.017 μm to 2,500 μm
Illuminant: Semiconductor laser (wavelength 680 nm, power 3 mW)

<HLB Value>

The HLB value of each type of silicone oil was calculated by the Griffin method using the following formula (3).

$$\text{HLB value} = 20 \times (\text{Sum total of formula weight of chain ethylene oxide structure/Molecular weight}) \quad (3)$$

A higher HLB value (closer to 20) indicates that the silicone oil has higher polarity and is hydrophilic, whereas a lower HLB value (closer to 0) indicates that the silicone oil has lower polarity and is lipophilic.

<Kinematic Viscosity>

The kinematic viscosity of each type of silicone oil was measured in accordance with ASTM D 445-46T as the kinematic viscosity $\eta^{CS/25}$ at 25° C. (units: mm$^2$/s=cSt (also referred to as "cs")) using an Ubbelohde viscometer.

<Tensile Elongation at Low Temperature>

The tensile elongation of a vinyl chloride resin molded product was evaluated by measuring the tensile elongation at break (%) at low temperature as described below, both for an initial state (unheated post-molding) and a post-heating (heat aging test) state.

<<Initial>>

A No. 1 dumbbell prescribed by JIS K6251 was punched out from an obtained vinyl chloride resin molded sheet and was used to measure the tensile elongation at break (%) at low temperature (−35° C.) and with a tensile rate of 200 mm/min in accordance with JIS K7161. A larger value for the tensile elongation at break indicates that the initial (unheated post-molding) vinyl chloride resin molded product has better low-temperature ductility.

<<Post-Heating (Heat Aging Test)>>

A laminate lined with a foamed polyurethane molded product was used as a sample. The sample was placed in an oven and was heated for 100 hours in a 130° C. environment. Next, the foamed polyurethane molded product was peeled from the post-heating laminate so as to prepare just a vinyl chloride resin molded sheet. The tensile elongation at break (%) of the vinyl chloride resin molded sheet that had been heated for 100 hours was measured under the same conditions as for the initial state. A larger value for the tensile elongation at break indicates that the post-heating (heat aging test) vinyl chloride resin molded product has better low-temperature ductility.

<Surface Lubricity>

The surface lubricity of a vinyl chloride resin molded product was evaluated by measuring the coefficient of kinetic friction as described below.

Specifically, a texture tester (TL201Ts (product name) produced by Trinity-Lab Inc.) was used to measure the coefficient of kinetic friction of the surface of a vinyl chloride resin molded sheet prior to formation of a laminate by bringing a haptic contactor into contact with the vinyl chloride resin molded sheet under conditions of a load of 50 g, a speed of 10 mm/s, a test range of 50 mm, and a measurement range of 30 mm (excluding 10 mm at the start and the end of the test range) in a measurement environment having a temperature of 23° C. and a relative humidity of 50%. A smaller value for the coefficient of kinetic friction indicates better surface lubricity of the vinyl chloride resin molded product and better suppression of surface stickiness.

<Level of Void Formation>

The level of void formation in a foamed polyurethane molded product of a laminate was evaluated as described below.

A vinyl chloride resin molded sheet was peeled from the laminate to prepare just the foamed polyurethane molded product (200 mm×300 mm×10 mm) as a sample. The sample was cut in a lateral direction at intervals of 50 mm (divided into 6 parts). The state of the cross-sections was visually checked. Specifically, spaces of 3 mm or more in diameter were taken to be voids, and the total number ($N_1$) of voids present in 6 cross-sections resulting from the dividing into 6 parts was counted.

In addition, a foamed polyurethane molded product was produced by the same procedure as in "Formation of laminate" of Example 1 with the exception that a vinyl chloride resin molded sheet was not placed in the mold. The produced foamed polyurethane molded product was then divided into 6 parts and the total number ($N_0$) of voids present in 6 cross-sections was counted in the same way as described above. Note that $N_0$ is the counted number of voids that are attributable to the operational procedure in formation of the foamed polyurethane molded product and does not include voids that are attributable to the vinyl chloride resin molded product.

For each sample, $N_0$ was taken as a reference (100%) for calculating a void formation rate (%) (=$N_1/N_0 \times 100$). The level of void formation was evaluated in accordance with the following standard. A lower void formation rate (closer to 100%) indicates that voids are not easily formed in a foamed polyurethane molded product laminated adjacently to the vinyl chloride resin molded product.

A: Void formation rate of lower than 120%
B: Void formation rate of at least 120% and less than 150%
C: Void formation rate of 150% or higher Note that in a case in which the void formation rate was less than 100%, this was regarded as a measurement error and was included among the above-described "A" evaluation.

Example 1

<Production of Vinyl Chloride Resin Composition>

With the exception of plasticizers (trimellitic acid ester and epoxidized soybean oil) and vinyl chloride resin fine particles used as a dusting agent, the ingredients indicated in Table 1 were supplied into and mixed in a Henschel mixer. The temperature of the mixture was raised to 80° C., at which point, all the plasticizers were added. The resultant mixture was then dried up by further raising the temperature thereof (i.e., the mixture changed to a dry state through absorption of the plasticizers by vinyl chloride resin particles used as a vinyl chloride resin). Thereafter, once the dried-up mixture had been cooled to a temperature of 100° C. or lower, the vinyl chloride resin fine particles used as the dusting agent were added to the mixture to produce a vinyl chloride resin composition.

<Formation of Vinyl Chloride Resin Molded Product>

The vinyl chloride resin composition obtained as described above was sprinkled onto a textured mold that was heated to a temperature of 250° C. and, after being left to melt for a given time of about 8 seconds to 20 seconds, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 200 mm×300 mm×1 mm was removed from the mold as a vinyl chloride resin molded product.

The obtained vinyl chloride resin molded sheet was used to measure and calculate the initial (unheated post-molding) tensile elongation at low temperature and the surface lubricity (coefficient of kinetic friction) by the previously described methods. The results are shown in Table 1.

<Formation of Laminate>

The obtained vinyl chloride resin molded sheet was left for 2 hours in an oven set to a temperature of 100° C. and was then placed in a 200 mm×300 mm×10 mm mold with the textured surface underneath.

A polyol mixture was separately obtained by mixing 50 parts of a propylene oxide (PO)/ethylene oxide (EO) block adduct of propylene glycol (hydroxyl value 28, terminal EO unit content 10%, internal EO unit content 4%), 50 parts of a PO/EO block adduct of glycerin (hydroxyl value 21, terminal EO unit content 14%), 2.5 parts of water, 0.2 parts of an ethylene glycol solution of triethylenediamine (TEDA-L33 (product name) produced by Tosoh Corporation), 1.2 parts of triethanolamine, 0.5 parts of triethylamine, and 0.5 parts of a foam stabilizer (F-122 (product name) produced by Shin-Etsu Chemical Co., Ltd.). A mixed solution was then prepared by mixing the obtained polyol mixture with polymethylene polyphenylene polyisocyanate (polymeric MDI) in a ratio determined to give an isocyanate index of 98. The prepared mixed solution was poured onto the vinyl chloride resin molded sheet that had been placed in the mold as described above. Thereafter, the mold was covered with a 348 mm×255 mm×10 mm aluminum plate to seal the mold. After sealing, the mold was left for 5 minutes such that a laminate was formed in the mold. The laminate included a vinyl chloride resin molded sheet (thickness: 1 mm) serving as a surface skin and, adjacent thereto, a foamed polyurethane molded product (thickness: 9 mm; density: 0.18 g/cm$^3$) lining (laminated with) the vinyl chloride resin molded sheet.

The formed laminate was removed from the mold and was used to measure and evaluate the post-heating (heat aging test) tensile elongation at low temperature and the level of void formation by the previously described methods. The results are shown in Table 1.

Example 2

A vinyl chloride resin composition, a vinyl chloride resin molded sheet, and a laminate were produced in the same way as in Example 1 with the exception that in production of the vinyl chloride resin composition, 0.2 parts of ether-modified silicone oil B was used instead of 0.3 parts of ether-modified silicone oil A as per the ingredients indicated in Table 1.

Measurements and evaluations were performed by the same methods as in Example 1. The results are shown in Table 1.

Example 3

A vinyl chloride resin composition, a vinyl chloride resin molded sheet, and a laminate were produced in the same way as in Example 1 with the exception that in production of the vinyl chloride resin composition, 0.4 parts of ether-modified silicone oil B was used instead of 0.3 parts of ether-modified silicone oil A as per the ingredients indicated in Table 1.

Measurements and evaluations were performed by the same methods as in Example 1. The results are shown in Table 1.

Example 4

A vinyl chloride resin composition, a vinyl chloride resin molded sheet, and a laminate were produced in the same way as in Example 1 with the exception that in production of the vinyl chloride resin composition, 0.2 parts of ether-modified silicone oil C was used instead of 0.3 parts of ether-modified silicone oil A as per the ingredients indicated in Table 1.

Measurements and evaluations were performed by the same methods as in Example 1. The results are shown in Table 1.

Example 5

A vinyl chloride resin composition, a vinyl chloride resin molded sheet, and a laminate were produced in the same way as in Example 1 with the exception that in production of the vinyl chloride resin composition, the amount of ether-modified silicone oil A was changed to 0.2 parts, and 0.1 parts of fatty acid amide-modified silicone oil was also used as per the ingredients indicated in Table 1.

Measurements and evaluations were performed by the same methods as in Example 1. The results are shown in Table 1.

Comparative Example 1

A vinyl chloride resin composition, a vinyl chloride resin molded sheet, and a laminate were produced in the same way as in Example 1 with the exception that in production of the vinyl chloride resin composition, no silicone oil was used, the amount of vinyl chloride resin fine particles A was changed from 8 parts to 10 parts, and 10 parts of vinyl chloride resin fine particles C were used instead of 8 parts of vinyl chloride resin fine particles B as per the ingredients indicated in Table 1.

Measurements and evaluations were performed by the same methods as in Example 1. The results are shown in Table 1.

Comparative Example 2

A vinyl chloride resin composition, a vinyl chloride resin molded sheet, and a laminate were produced in the same way as in Example 1 with the exception that in production of the vinyl chloride resin composition, 0.4 parts of unmodified silicone oil was used instead of 0.3 parts of ether-modified silicone oil A, the amount of vinyl chloride resin fine particles A was changed from 8 parts to 10 parts, and 10 parts of vinyl chloride resin fine particles C were used instead of 8 parts of vinyl chloride resin fine particles B as per the ingredients indicated in Table 1.

Measurements and evaluations were performed by the same methods as in Example 1. The results are shown in Table 1.

Comparative Example 3

A vinyl chloride resin composition, a vinyl chloride resin molded sheet, and a laminate were produced in the same way as in Example 1 with the exception that in production of the vinyl chloride resin composition, 0.4 parts of silanol-modified silicone oil was used instead of 0.3 parts of ether-modified silicone oil A, the amount of vinyl chloride resin fine particles A was changed from 8 parts to 10 parts, and 10 parts of vinyl chloride resin fine particles C were used instead of 8 parts of vinyl chloride resin fine particles B as per the ingredients indicated in Table 1.

Measurements and evaluations were performed by the same methods as in Example 1. The results are shown in Table 1.

Comparative Example 4

A vinyl chloride resin composition, a vinyl chloride resin molded sheet, and a laminate were produced in the same way as in Example 1 with the exception that in production of the vinyl chloride resin composition, 0.2 parts of fatty acid amide-modified silicone oil was used instead of 0.3 parts of ether-modified silicone oil A as per the ingredients indicated in Table 1.

Measurements and evaluations were performed by the same methods as in Example 1. The results are shown in Table 1.

TABLE 1

| | | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Vinyl chloride resin composition | Vinyl chloride resin | Base material | Vinyl chloride resin particles[1] [parts by mass] | 100 | 100 | 100 | 100 | 100 | 100 | 100 | 100 | 100 |
| | | Dusting agent | Vinyl chloride resin fine particles A[2] [parts by mass] | 8 | 8 | 8 | 8 | 8 | 10 | 10 | 10 | 8 |
| | | | Vinyl chloride resin fine particles B[3] [parts by mass] | 8 | 8 | 8 | 8 | 8 | — | — | — | 8 |
| | | | Vinyl chloride resin fine particles C[4] [parts by mass] | — | — | — | — | — | 10 | 10 | 10 | — |
| | Plasticizer | | Trimellitic acid ester[5] [parts by mass] | 110 | 110 | 110 | 110 | 110 | 110 | 110 | 110 | 110 |
| | | | Epoxidized soybean oil[6] [parts by mass] | 5 | 5 | 5 | 5 | 5 | 5 | 5 | 5 | 5 |
| | Silicone oil | | Ether-modified silicone oil A (HLB value: 6; kinematic viscosity: 1,000 cSt)[7] [parts by mass] | 0.3 | — | — | — | 0.2 | — | — | — | — |
| | | | Ether-modified silicone oil B (HLB value: 2; kinematic viscosity: 500 cSt)[8] [parts by mass] | — | 0.2 | 0.4 | — | — | — | — | — | — |
| | | | Ether-modified silicone oil C (HLB value: 1; kinematic viscosity: 70 cSt)[9] [parts by mass] | — | — | — | 0.2 | — | — | — | — | — |
| | | | Fatty acid amide-modified silicone oil (HLB value: 0; paste)[10] [parts by mass] | — | — | — | — | 0.1 | — | — | — | — |
| | | | Unmodified silicone oil (HLB value: 0; kinematic viscosity: 5,000 cSt)[11] [parts by mass] | — | — | — | — | — | — | 0.4 | — | 0.2 |
| | | | Silanol-modified silicone oil (HLB value: 0; kinematic viscosity: 60 cSt)[12] [parts by mass] | — | — | — | — | — | — | — | 0.4 | — |
| | Stabilizer | | Perchloric acid-treated hydrotalcite[13] | 4.56 | 4.56 | 4.56 | 4.56 | 4.56 | 4.56 | 4.56 | 4.56 | 4.56 |
| | | | Zeolite[14] [parts by mass] | 2.42 | 2.42 | 2.42 | 2.42 | 2.42 | 2.42 | 2.42 | 2.42 | 2.42 |
| | | | β-Diketone[15] [parts by mass] | 0.49 | 0.49 | 0.49 | 0.49 | 0.49 | 0.49 | 0.49 | 0.49 | 0.49 |
| | | | Zinc stearate[16] [parts by mass] | 0.20 | 0.20 | 0.20 | 0.20 | 0.20 | 0.20 | 0.20 | 0.20 | 0.20 |
| | Mold release agent | | 12-Hydroxystearic acid[17] [parts by mass] | 0.4 | 0.4 | 0.4 | 0.4 | 0.4 | 0.4 | 0.4 | 0.4 | 0.4 |
| | Other additives | | Carbon black-based pigment[18] [parts by mass] | 4.82 | 4.82 | 4.82 | 4.82 | 4.82 | 4.82 | 4.82 | 4.82 | 4.82 |
| Content of ether-modified silicone oil [parts by mass vs. 100 parts by mass of vinyl chloride resin] | | | | 0.26 | 0.17 | 0.34 | 0.17 | 0.17 | 0 | 0 | 0 | 0 |
| Content of ether-modified silicone oil [parts by mass vs. 100 parts by mass of plasticizer] | | | | 0.26 | 0.17 | 0.35 | 0.17 | 0.17 | 0 | 0 | 0 | 0 |
| Content of ether-modified silicone oil [times vs. total content of fatty acid amide-modified silicone oil and unmodified silicone oil] | | | | — | — | — | — | 2.0 | — | 0 | — | 0 |
| Content of all silicone oil [parts by mass vs. 100 parts by mass of vinyl chloride resin] | | | | 0.26 | 0.17 | 0.34 | 0.17 | 0.26 | 0 | 0.33 | 0.33 | 0.17 |
| Content of all silicone oil [parts by mass vs. 100 parts by mass of plasticizer] | | | | 0.26 | 0.17 | 0.35 | 0.17 | 0.26 | 0 | 0.35 | 0.35 | 0.17 |

TABLE 1-continued

| Evaluations | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Tensile elongation at low temperature (−35° C.) of vinyl chloride resin molded product | Initial [%] | 180 | 190 | 190 | 180 | 180 | 180 | 180 | 180 | 180 |
| | Post-heating (130° C. × 100 hr) [%] | 130 | 130 | 130 | 130 | 130 | 120 | 130 | 120 | 130 |
| Surface lubricity of vinyl chloride resin molded product (coefficient of kinetic friction at 23° C. and 50% RH) [—] | | 0.89 | 0.73 | 0.73 | 0.74 | 0.76 | 1.00 | 0.71 | 0.72 | 0.60 |
| Level of void formation in foamed polyurethane molded product | | A | A | A | A | A | A | C | C | C |

(1) ZEST® (ZEST is a registered trademark in Japan, other countries, or both) 1700ZI (product name) produced by Shin Dai-ichi Vinyl Corporation (suspension polymerization method; average degree of polymerization: 1700; average particle diameter: 130 μm)
(2) ZEST PQLTX (product name) produced by Shin Dai-ichi Vinyl Corporation (emulsion polymerization method; average degree of polymerization: 800; average particle diameter: 1.8 μm)
(3) Ryuron Paste® (Ryuron Paste is a registered trademark in Japan, other countries, or both) 860 (product name) produced by Tosoh Corporation (emulsion polymerization method; average degree of polymerization: 1,600; average particle diameter: 1.6 μm)
(4) Ryuron paste® 761 (product name) produced by Tosoh Corporation (emulsion polymerization method; average degree of polymerization: 2,100; average particle diameter: 1.6 μm)
(5) TRIMEX N-08 (product name) produced by Kao Corporation
(6) ADK CIZER O-130S (product name) produced by ADEKA Corporation
(7) F242TL (product name) produced by Shin-Etsu Chemical Co., Ltd. (ether-modified silicone oil [ether group having chain ethylene oxide structure and chain propylene oxide structure introduced to side chain]; HLB value: 6; kinematic viscosity at 25° C.: 1,000 cSt)
(8) X-50-1039A (product name) produced by Shin-Etsu Chemical Co., Ltd. (ether-modified silicone oil [ether group having chain ethylene oxide structure and chain propylene oxide structure introduced to side chain]; HLB value: 2; kinematic viscosity at 25° C.: 500 cSt)
(9) X-22-2516 (product name) produced by Shin-Etsu Chemical Co., Ltd. (ether-modified silicone oil [ether group having chain ethylene oxide structure, chain propylene oxide structure, and organic structure, long-chain alkyl group, and aralkyl group introduced to side chains at different sites]; HLB value: 1; kinematic viscosity at 25° C.: 70 cSt)
(10) KF-3935 (product name) produced by Shin-Etsu Chemical Co., Ltd. (higher fatty acid amide-modified silicone oil [fatty acid amide group introduced]; HLB value: 0; paste at normal temperature and normal pressure)
(11) KF-96 (product name) produced by Shin-Etsu Chemical Co., Ltd. (unmodified silicone oil; HLB value: 0; kinematic viscosity at 25° C.: 5,000 cSt)
(12) KF-9701 (product name) produced by Shin-Etsu Chemical Co., Ltd. (silanol-modified silicone oil; HLB value: 0; kinematic viscosity at 25° C.: 60 cSt)
(13) ALCAMIZER® (ALCAMIZER is a registered trademark in Japan, other countries, or both) 5 (product name) produced by Kyowa Chemical Industry Co., Ltd.
(14) MIZUKALIZER DS (product name) produced by Mizusawa Industrial Chemicals, Ltd.
(15) Karenz DK-1 (product name) produced by Showa Denko K.K.
(16) SAKAI SZ2000 (product name) produced by Sakai Chemical Industry Co., Ltd.
(17) ADK STAB LS-12 (product name) produced by ADEKA Corporation
(18) DA PX 1720(A) Black (product name) produced by Dainichiseika Color and Chemicals Mfg. Co., Ltd.

It can be seen from Table 1 that in Comparative Examples 1 to 4 in which ether-modified silicone oil was not used, it was not possible to achieve a balance of both excellent surface lubricity of a vinyl chloride resin sheet and inhibition of void formation in a foamed polyurethane molded product laminated with the vinyl chloride resin sheet.

More specifically, in Comparative Example 1 in which no silicone oil was used, although voids were not formed in the foamed polyurethane molded product laminated adjacently to the vinyl chloride resin sheet, surface lubricity of the vinyl chloride resin sheet was remarkably poor. In Comparative Examples 2 to 4 in which only unmodified silicone oil, only silanol-modified silicone oil, or only fatty acid amide-modified silicone oil was used, although surface lubricity of the vinyl chloride resin sheet was excellent, voids were easily formed in the foamed polyurethane molded product laminated adjacently to the vinyl chloride resin sheet.

In contrast, it can be seen that surface lubricity of a vinyl chloride resin sheet was excellent and void formation in a foamed polyurethane molded product laminated with the vinyl chloride resin sheet was favorably inhibited in Examples 1 to 5 in which a vinyl chloride resin, a plasticizer, and silicone oil were included and in which the silicone oil included at least ether-modified silicone oil.

INDUSTRIAL APPLICABILITY

According to the present disclosure, it is possible to provide a vinyl chloride resin molded product that has excellent surface lubricity and can inhibit formation of voids in a foamed polyurethane molded product laminated therewith, and also to provide a vinyl chloride resin composition that enables production of this vinyl chloride resin molded product.

Moreover, according to the present disclosure, it is possible to provide a laminate that includes a foamed polyurethane molded product and a vinyl chloride resin molded product, has excellent surface lubricity, and in which formation of voids has been suppressed.

The invention claimed is:

1. A vinyl chloride resin composition comprising a vinyl chloride resin, a plasticizer, and silicone oil, wherein the silicone oil includes ether-modified silicone oil, fatty acid amide-modified silicone oil, and unmodified silicone oil, wherein
the content of the plasticizer per 100 parts by mass of the vinyl chloride resin is 70 parts by mass or more and 200 parts by mass or less;
the content of the ether-modified silicone oil per 100 parts by mass of the vinyl chloride resin is 0.01 parts by mass or more and 0.3 parts by mass or less, wherein the ether-modified silicone oil has an ether group introduced to one or more of a main chain including siloxane linkages, a side chain of the main chain, and a terminal of the main chain, and
the ether group has a structure represented by a general formula (1):

where x is a natural number of 1 or more, and
a structure represented by a general formula (2):

where y is a natural number of 1 or more, and does not include an unsaturated bond;
the content of the fatty acid amide-modified silicone oil per 100 parts by mass of the vinyl chloride resin is 0.005 parts by mass or more and 0.15 parts by mass or less; and
the content of the ether-modified silicone oil is at least 1.3 times and not more than 5 times the total content of the fatty acid amide-modified silicone oil and the unmodified silicone oil.

2. The vinyl chloride resin composition according to claim 1, wherein the ether-modified silicone oil has an HLB value of 3 or less.

3. The vinyl chloride resin composition according to claim 1, wherein the ether-modified silicone oil has an HLB value of 4 or more.

4. The vinyl chloride resin composition according to claim 1, wherein the ether-modified silicone oil has a kinematic viscosity of 65 cSt or more.

5. The vinyl chloride resin composition according to claim 1 used for powder molding.

6. The vinyl chloride resin composition according to claim 5 used for powder slush molding.

7. A vinyl chloride resin molded product obtained through molding of the vinyl chloride resin composition according to claim 5.

8. The vinyl chloride resin molded product according to claim 7 for a surface skin of an automobile instrument panel.

9. A laminate comprising:
a foamed polyurethane molded product; and
the vinyl chloride resin molded product according to claim 7.

10. The vinyl chloride resin composition according to claim 1, wherein the total content of the fatty acid amide-modified silicone oil and the unmodified silicone oil per 100 parts by mass of the plasticizer is 0.01 parts by mass or more and 0.5 parts by mass or less.

11. The vinyl chloride resin composition according to claim 1, wherein the content of all silicone oil per 100 parts by mass of the vinyl chloride resin is 0.01 parts by mass or more and 0.5 part by mass or less.

12. The vinyl chloride resin composition according to claim 1, wherein the content of all silicone oil per 100 parts by mass of the plasticizer is 0.01 parts by mass or more and 0.5 part by mass or less.

* * * * *